(12) United States Patent
Ito et al.

(10) Patent No.: US 12,545,162 B2
(45) Date of Patent: Feb. 10, 2026

(54) BACK SUPPORT DEVICE AND VEHICLE SEAT

(71) Applicants: NHK SPRING CO., LTD., Yokohama (JP); SUBARU CORPORATION, Tokyo (JP)

(72) Inventors: Keishiro Ito, Yokohama (JP); Takumi Abe, Yokohama (JP); Yosuke Ishiyama, Tokyo (JP); Yohei Sugihira, Tokyo (JP); Masato Fukushima, Tokyo (JP)

(73) Assignees: NHK Spring Co., Ltd., Yokohama (JP); SUBARU CORPORATION, Tokyo (JP)

( * ) Notice: Subject to any disclaimer, the term of this patent is extended or adjusted under 35 U.S.C. 154(b) by 202 days.

(21) Appl. No.: 18/454,717

(22) Filed: Aug. 23, 2023

(65) Prior Publication Data
US 2024/0067067 A1    Feb. 29, 2024

(30) Foreign Application Priority Data
Aug. 30, 2022 (JP) ................................ 2022-136706

(51) Int. Cl.
*B60N 2/66* (2006.01)
*B60N 2/56* (2006.01)

(52) U.S. Cl.
CPC ......... *B60N 2/6673* (2015.04); *B60N 2/5621* (2013.01); *B60N 2/666* (2015.04); *B60N 2/667* (2015.04)

(58) Field of Classification Search
CPC ..... B60N 2/667; B60N 2/6671; B60N 2/6673
See application file for complete search history.

(56) References Cited

U.S. PATENT DOCUMENTS

| 8,727,434 | B2 * | 5/2014 | Sahashi | .................... | B60N 2/66 |
| | | | | | 297/180.13 |
| 8,998,311 | B2 * | 4/2015 | Axakov | ............... | B60N 2/5635 |
| | | | | | 297/180.13 |
| 10,293,720 | B2 * | 5/2019 | Okimura | .................. | B60N 2/58 |

(Continued)

FOREIGN PATENT DOCUMENTS

| CN | 113547969 A | * | 10/2021 | ............... | B60N 2/66 |
| KR | 102088708 B1 | * | 3/2020 | | |

(Continued)

*Primary Examiner* — Timothy J Brindley
(74) *Attorney, Agent, or Firm* — Knobbe, Martens, Olson & Bear, LLP

(57) ABSTRACT

A back support device, comprising: a frame portion provided at a seat on which a seated person is seated, the frame portion including a locked portion at an upper portion of the frame portion; an upper frame portion fixed to the upper portion of the frame portion and extending in a seat width direction below the locked portion; a lumbar support portion engaged with a lower portion of the frame portion and configured to support a waist of the seated person from a seat rear side; and a pressure receiving portion including, at an upper end portion thereof, a locking portion locked to the locked portion, the pressure receiving portion being supported by the upper frame portion and the lumbar support portion from the seat rear side, and being configured to be deformable by receiving a load from a back of the seated person.

4 Claims, 7 Drawing Sheets

(56) References Cited

U.S. PATENT DOCUMENTS

| | | | | |
|---|---|---|---|---|
| 10,625,565 | B2* | 4/2020 | Fukuda | B60H 1/0055 |
| 11,091,074 | B1* | 8/2021 | Jeong | B60N 2/58 |
| 12,257,942 | B2* | 3/2025 | Yamaguchi | B60N 2/914 |
| 2009/0295200 | A1* | 12/2009 | Ito | B60N 2/809 |
| | | | | 297/180.14 |
| 2013/0300179 | A1* | 11/2013 | Ota | B60N 2/66 |
| | | | | 297/452.42 |
| 2015/0306999 | A1* | 10/2015 | Awatani | B60N 2/6673 |
| | | | | 297/180.14 |
| 2018/0126882 | A1 | 5/2018 | Okimura | |
| 2020/0238868 | A1* | 7/2020 | Ioppolo | B60N 2/667 |
| 2023/0311729 | A1* | 10/2023 | Blair | B60N 2/665 |
| 2024/0075858 | A1* | 3/2024 | Ito | B60N 2/5657 |

FOREIGN PATENT DOCUMENTS

| | | | | |
|---|---|---|---|---|
| WO | WO-2011162452 A1 * | 12/2011 | | B60N 2/0232 |
| WO | WO-2016065526 A1 * | 5/2016 | | B60N 2/5642 |
| WO | 2017/022492 A1 | 2/2017 | | |

\* cited by examiner

BACK SUPPORT DEVICE AND VEHICLE SEAT

CROSS-REFERENCE TO RELATED APPLICATION

This application is based on and claims priority under 35 USC 119 from Japanese Patent Application No. 2022-136706 filed on Aug. 30, 2022, the disclosure of which is incorporated by reference herein.

BACKGROUND

Technical Field

The present disclosure relates to a back support device and a vehicle seat.

Related Art

WO 2017/022492 A discloses a vehicle seat including a lumbar support device inside a seat back. The lumbar support device described in WO 2017/022492 A is supported by the seat back frame, and is configured to change a support state of a waist by deforming a portion corresponding to the waist of an occupant.

The lumbar support device described in WO 2017/022492 A includes a pressure receiving plate (pressure receiving portion) that receives a load from a back of an occupant via a cushion member, and a support member that supports the pressure receiving plate and is configured to deform the pressure receiving plate. The support member includes a U-shaped wire (frame portion) extending in the vertical direction and an upper connecting portion (upper frame portion) that connects upper portions of the wires to each other in the seat width direction.

A support projection is provided on the front side of the upper connecting portion. An attachment hook is provided at an upper end portion on the rear side of the pressure receiving plate. When the attachment hook is fitted to the support projection, the pressure receiving plate is rotatably attached to the upper connecting portion with the attachment hook as a fulcrum. That is, in the seat described in International Publication No. 2017/022492 A, in a case in which the occupant is seated, the pressure receiving plate is deformed with the attachment hook as a fulcrum by the load received from the waist of the occupant, and the seat is configured to extend along the waist of the occupant.

However, in a case in which the occupant seated on the seat described in WO 2017/022492 A is in a posture of, for example, greatly leaning against the seat back or stretching to warp the back, the contact of the upper end portion of the pressure receiving plate with the back becomes strong, and the occupant may feel a feeling of a foreign body in the seat back. Therefore, there is room for improvement in supporting the back of the occupant without impairing comfort regardless of the seated posture of the occupant.

SUMMARY

The present disclosure provides a back support device and a vehicle seat capable of supporting a back without impairing comfort regardless of a posture of a seated person.

According to a first aspect, there is provided a back support device including: a frame portion provided at a seat on which a seated person is seated, the frame portion including a locked portion at an upper portion of the frame portion; an upper frame portion fixed to the upper portion of the frame portion and extending in a seat width direction below the locked portion; a lumbar support portion engaged with a lower portion of the frame portion and configured to support a waist of a seated person from a seat rear side; and a pressure receiving portion including, at an upper end portion thereof, a locking portion locked to the locked portion, the pressure receiving portion being supported by the upper frame portion and the lumbar support portion from the seat rear side, and being configured to be deformable by receiving a load from a back of the seated person.

According to the back support device of the first aspect, when the seated person sits on the seat, the pressure receiving portion is deformed by receiving a load from the back of the seated person. The locking portion provided at the upper end portion of the pressure receiving portion is locked to the locked portion provided at the upper portion of the frame portion. The pressure receiving portion is supported by the upper frame portion and the lumbar support portion from the seat rear side. Therefore, the load applied to the pressure receiving portion is transmitted to the frame portion via the locking portion, the upper frame portion, and the lumbar support portion.

Here, the waist of the seated person is supported by the lumbar support portion. While the lumbar support portion is engaged with the lower portion of the frame portion, the upper frame portion is fixed to the upper portion of the frame portion. Therefore, the back above the waist of the seated person is supported by the upper frame portion. That is, by the pressure receiving portion supported from the seat rear side by the lumbar support portion and the upper frame portion, not only the waist of the seated person is supported but also the back thereof in a wide range including the upper side of the waist is supported.

The pressure receiving portion is supported at at least three locations of the locking portion, the portion supported by the upper frame portion, and the portion supported by the lumbar support portion in a side view. Here, the locking portion provided at the upper end portion of the pressure receiving portion is locked to the locked portion of the frame portion on the upper side of the upper frame portion. Therefore, the back of the seated person can be stably supported in a wide range.

Since the locking portion provided at the upper end portion of the pressure receiving portion is locked to the locked portion of the frame portion, the position of the locking portion with respect to the frame portion is constant regardless of the seated state of the seated person. Therefore, for example, even in a case in which the seated person largely leans against the seat back while seated, or takes a posture of stretching and warping the back, the upper end of the pressure receiving portion can be suppressed from protruding toward the back of the seated person to give discomfort.

In a back support device according to a second aspect, in the first aspect, a protrusion extending in the seat width direction and protruding toward the seat rear side is formed at a position facing the upper frame portion at a seat rear side of the pressure receiving portion.

According to the back support device of the second aspect, the pressure receiving portion is rotated about the protrusion with the seat width direction as an axial direction. Therefore, the pressure receiving portion can smoothly change a direction thereof on the front side of the upper frame portion.

A back support device according to a third aspect, in the first aspect, the pressure receiving portion includes an opening formed above the protrusion and penetrating the pressure receiving portion.

According to the back support device of the third aspect, while the pressure receiving portion supports the back of the seated person on the upper side of the protrusion provided at the position corresponding to the upper frame portion, the weight of the pressure receiving portion can be reduced by the opening portion. Another device can be provided in the opening portion.

According a fourth aspect, there is provided a vehicle seat including: a seat back internally including the back support device according to claim 3 and a seat back frame to which the back support device is connected and which configures a frame; and a seat cushion connected to a lower end portion of the seat back and configured to support a hip and a thigh of a seated person.

According to the vehicle seat of the fourth aspect, the load transmitted from the back of the seated person to the frame via the pressure receiving portion is transmitted to the seat back frame connected to the frame portion. Therefore, the back of the seated person is comfortably supported by the seat back including the back support device. This makes it possible to suppress discomfort from being given to the seated person regardless of the posture of the seated person.

According to a vehicle seat according to a fifth aspect, in the fourth aspect, the vehicle seat further includes, an air conditioner attached to a seat rear side of the seat back frame and performing at least one of blowing and suctioning of air; and a flow path forming portion connected to the air conditioner, inserted into the opening of the back support device, and performing at least one of the blowing of air to a seating surface side for seating in the seat back or the suctioning of air from the seating surface side.

According to the vehicle seat of the fifth aspect, the flow path forming portion connected to the air conditioner is inserted through the opening portion of the pressure receiving portion in the back support device. Therefore, the air conditioning device can be disposed in the seat back with high space efficiency.

The back support device of the first aspect has an excellent effect that the back can be supported without impairing comfort regardless of the posture of the seated person.

The back support device of the second aspect has an excellent effect of being able to comfortably support the back on the upper side of the waist of the seated person.

The back support device of the third aspect has an excellent effect of reducing the weight and improving the degree of freedom in design and space efficiency.

The vehicle seat according to the fourth aspect has an excellent effect that the back can be supported without impairing comfort regardless of the posture of the seated person.

The vehicle seat according to the fifth aspect has an excellent effect that the seat back can be air-conditioned while comfortably supporting the back of the seated person.

BRIEF DESCRIPTION OF THE DRAWINGS

An exemplary embodiment of the present disclosure will be described in detail based on the following figures, wherein.

DETAILED DESCRIPTION

Hereinafter, a vehicle seat 12 on which a back support device 10 according to an embodiment of the present disclosure is mounted will be described with reference to FIGS. 1 to 7. An arrow FR, an arrow UP, an arrow LH, and an arrow RH appropriately illustrated in each drawing indicate a seat front side, a seat upper side, a left side in a seat width direction, and a right side in the seat width direction of the vehicle seat 12. In the following description, in a case in which front and rear, upper and lower, and left and right directions are used without particular description, front and rear in a seat front-rear direction, upper and lower in a seat up-down direction, and left and right in a seat left-right direction (width direction) are respectively indicated.

First, the entire configuration of the vehicle seat 12 will be described with reference to FIG. 1, the entire configuration of the back support device 10 will be described with reference to FIGS. 2 and 3, and then the main part of the back support device 10 will be described with reference to FIGS. 4 to 7.

[Overall Configuration of Vehicle Seat 12]

Figure 1:
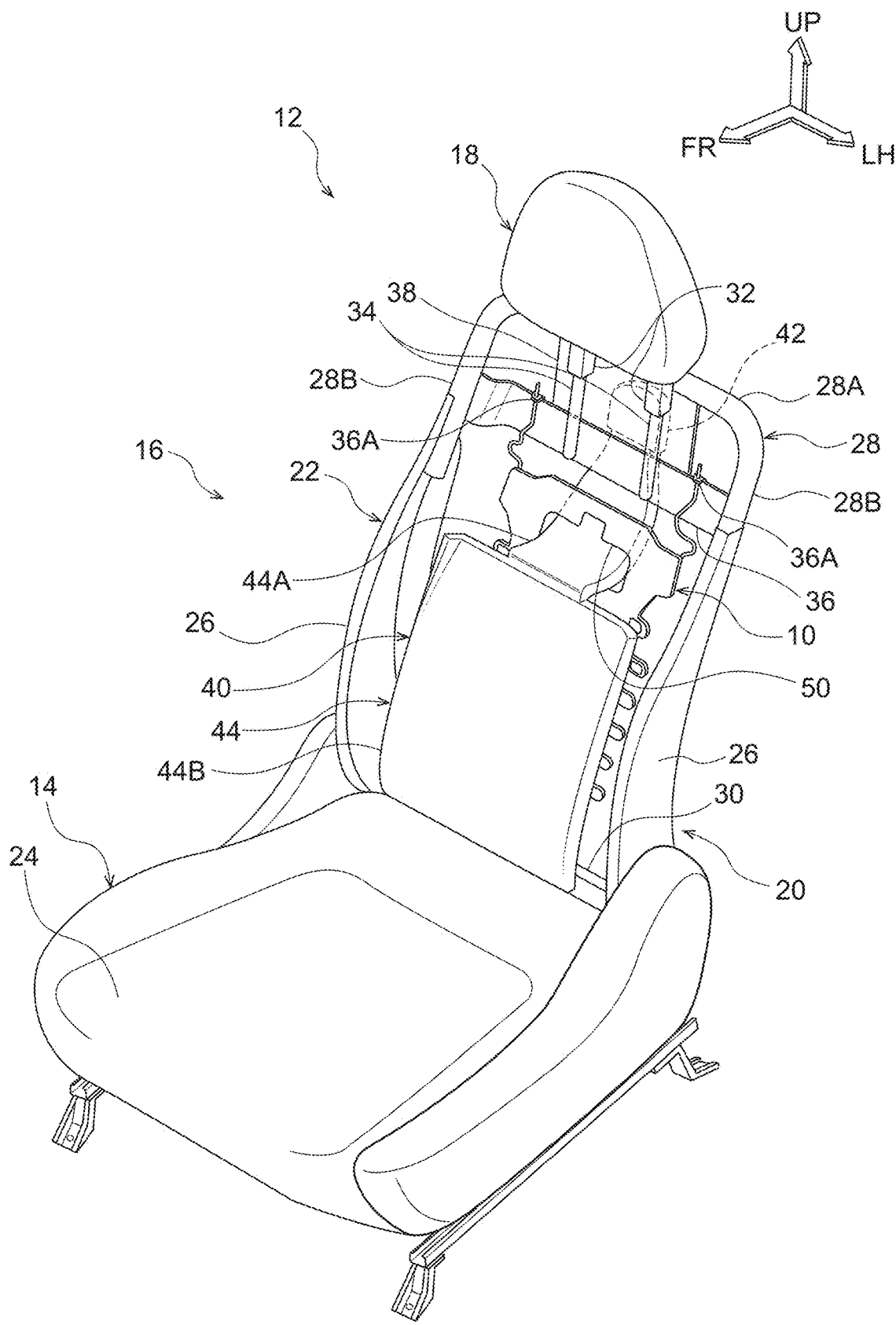
FIG. 1 is a front perspective view of a vehicle seat on which a back support device according to the present embodiment is mounted.

A vehicle seat 12 illustrated in FIG. 1 includes a seat cushion 14 configured to be able to support a hip and a thigh of an occupant P (see FIG. 2) as a seated person, a seat back 16 connected to a rear end portion of the seat cushion 14 and configured to be able to support a back B (see FIG. 2) of the occupant P, and a headrest 18 connected to an upper end portion of the seat back 16 and configured to be able to support a head of the occupant P.

The vehicle seat 12 includes a seat frame 20 that is a frame member made of metal, for example. The seat frame 20 includes a seat cushion frame (not illustrated) constituting a frame of the seat cushion 14 and a seat back frame 22 constituting a frame of the seat back 16. The seat back frame 22 is rotatably attached to a rear portion of the seat cushion frame via a recliner (not illustrated).

Pads (not illustrated) molded from foam such as urethane foam are mounted on the seat cushion frame (not illustrated) and the seat back frame 22. These pads are covered with a skin 24 formed by sewing a plurality of skin pieces made of a cloth material, a knit material, synthetic leather, leather, or the like. In FIG. 1, in order to clearly illustrate the internal structure of the seat back 16, illustration of the pad and the skin 24 mounted on the seat back frame 22 is omitted.

(Seat Back Frame 22)

As illustrated in FIG. 1, the seat back frame 22 includes a pair of left and right side frames 26 extending substantially vertically at both end portions in the seat width direction, an upper frame 28 coupling upper end portions of the pair of left and right side frames 26 in the seat width direction, and a lower frame 30 coupling lower end portions of the pair of left and right side frames 26 in the seat width direction.

The upper frame 28 is formed in a substantially U shape with its lower side opened as viewed in the seat front-rear direction, and includes an upper pipe 28A extending in the seat width direction and a pair of left and right upper side pipes 28B extending downward from both end portions of the upper pipe 28A in the seat width direction. Lower portions of the pair of left and right upper side pipes 28B are fixed to upper end portions of the pair of left and right side frames 26, respectively.

A pair of left and right stay support portions 32 extending substantially in the vertical direction is fixed to the upper pipe 28A of the upper frame 28. Each of the pair of left and right stay support portions 32 is formed in a tubular shape, and a pair of left and right headrest stays 34 of the headrest 18 is inserted therethrough.

A bridge frame 36 extending in the seat width direction is provided below the upper pipe 28A. Both end portions in the seat width direction of the bridge frame 36 are fixed to the pair of left and right upper side pipes 28B, respectively.

A pair of left and right upper support portions 36A formed in a substantially cylindrical shape is provided at an upper end portion of the bridge frame 36. A support wire 56 (see FIG. 3) of the back support device 10 to be described later is inserted and fitted into the upper support portion 36A. As described above, the upper end portion of the back support device 10 is connected to the bridge frame 36 to be supported by the seat back frame 22.

A lower support portion (not illustrated) is provided at the central portion of the lower frame 30 of the seat back frame 22 in the seat width direction. The lower support portion is provided with a pair of left and right support holes (not illustrated) penetrating substantially in the front-rear direction. A coupling portion 68 (see FIGS. 2 and 3) provided at a lower end portion of the back support device 10 is disposed to overlap a lower support portion (not illustrated) of the lower frame 30. A pair of left and right lower support holes 68A (see FIG. 3) is formed in the coupling portion 68 (see FIGS. 2 and 3), and the pair of left and right lower support holes 68A (see FIG. 3) of the coupling portion 68 (see FIGS. 2 and 3) is fastened to the pair of left and right support holes (not illustrated) of the lower frame 30 by a bolt and a nut (not illustrated) in a state where the pair of left and right support holes is overlapped with the pair of left and right support holes (not illustrated). As described above, the lower end portion of the back support device 10 is connected to the lower frame 30 to be supported by the seat back frame 22.

(Air Conditioning Device 40)

The seat back 16 incorporates an air conditioning device 40 that blows air toward the seating surface of the seat back 16. The seating surface side of the seat back 16 refers to a side on which the occupant P (see FIG. 2) is seated, that is, a front side of the seat back 16.

The air conditioning device 40 includes a blower 42 as an air conditioner that is attached to the seat rear side of the seat back frame 22 and blows air, and a flow path forming portion 44 that is connected to the blower 42 and blows air to the seating surface side of the seat back 16.

The blower 42 is fixed to a blower fixing plate 38 provided between the upper pipe 28A of the seat back frame 22 and the bridge frame 36 when viewed from the seat front-rear direction. The upper end portion of the blower fixing plate 38 is fixed to the rear side of the central portion of the upper pipe 28A in the seat width direction. The lower end portion of the blower fixing plate 38 is fixed to the rear side of the central portion of the bridge frame 36 in the seat width direction.

The flow path forming portion 44 includes a duct portion 44A having an upper end portion connected to the blower 42, and a ventilation portion 44B having an upper end portion connected to a lower end portion (front end portion) of the duct portion 44A. The ventilation portion 44B extends in the seat width direction and the substantially vertical direction along the back B of the occupant P (see FIG. 3).

The duct portion 44A is formed in a substantially rectangular shape whose vertical direction is the longitudinal direction is when viewed from the seat front-rear direction. The duct portion 44A is formed in a substantially J shape in a side view as viewed from the left side in the seat width direction, and is inserted into an opening portion 50 (see FIG. 3) formed in an upper portion of a basket 54 (see FIGS. 2 and 3) of the back support device 10 described later.

The ventilation portion 44B is formed in a substantially rectangular shape larger than the duct portion 44A when viewed from the seat front-rear direction. A plurality of open circular ventilation ports (not illustrated) is formed on the front side of the ventilation portion 44B. The air sent from the blower 42 is sent to the ventilation portion 44B via the duct portion 44A, and sent out from the ventilation opening of the ventilation portion 44B to the seating surface side of the seat back 16.

[Overall Configuration of Back Support Device 10]

Next, an overall configuration of the back support device 10 incorporated in the seat back 16 will be described.

Figure 2:
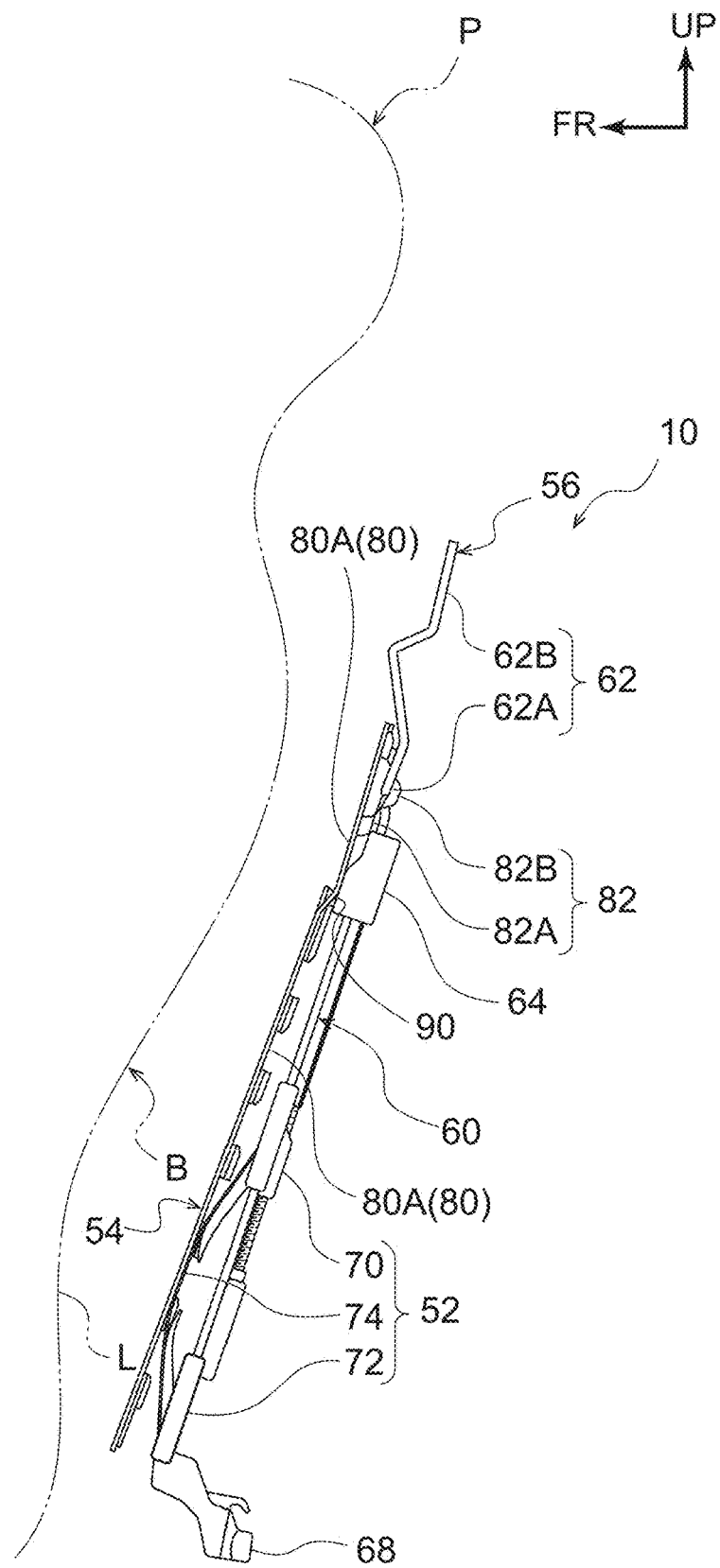
FIG. 2 is a left side view of the back support device illustrated in FIG. 1.

As illustrated in FIG. 2, the back support device 10 includes a lumbar support portion 52 configured to be able to support a waist L including the lumbar of the occupant P from the rear side, and a basket 54 as a pressure receiving portion supported by the lumbar support portion 52 from the rear side and configured to be deformable by receiving a load from the back B including the waist L of the occupant P.

Figure 3:
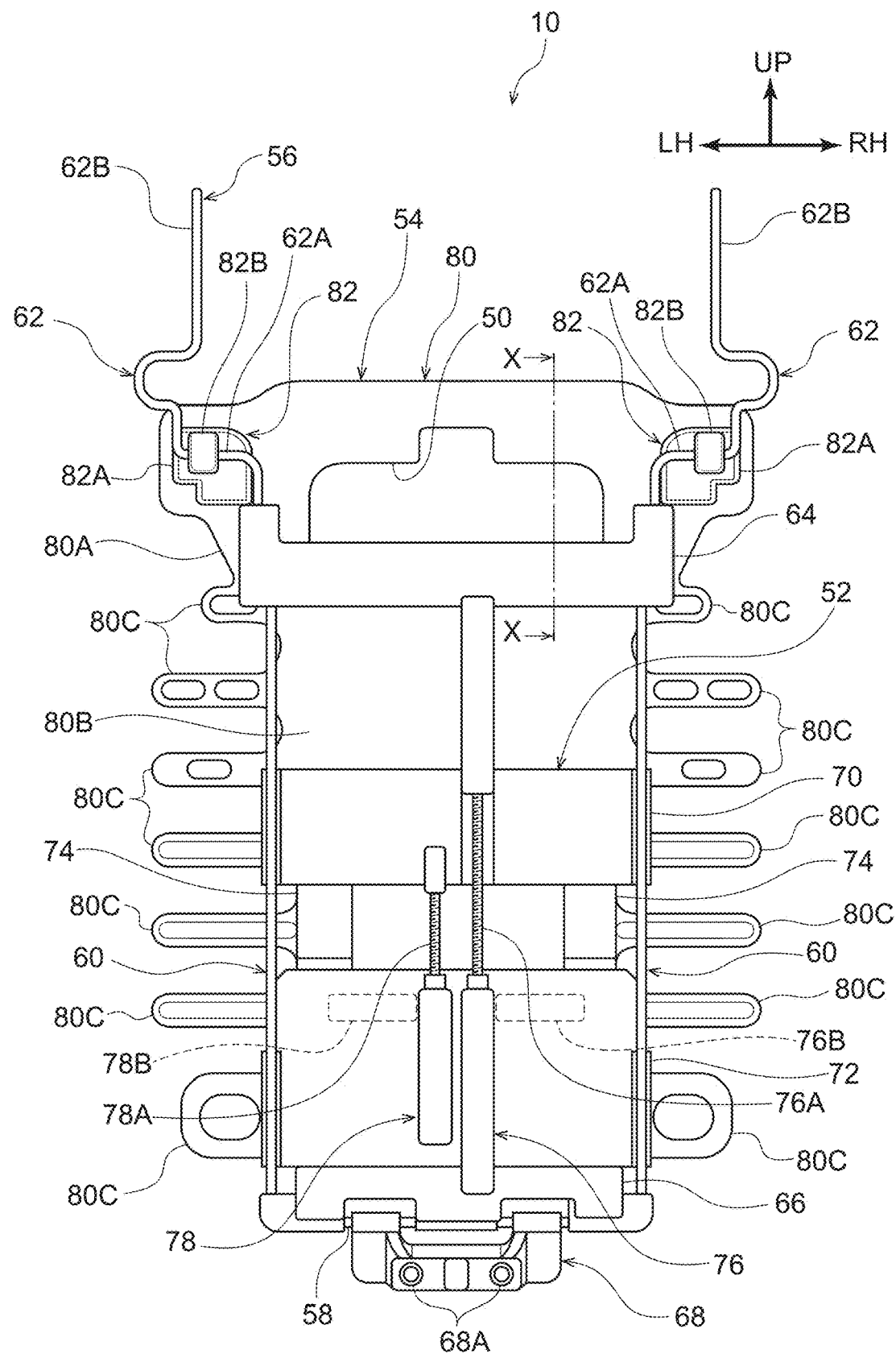
FIG. 3 is a rear view of the back support device illustrated in FIG. 2.

As illustrated in FIG. 3, the back support device 10 includes a support wire 56 as a frame portion formed in a substantially U shape with an upper side opened when viewed from the front-rear direction. The support wire 56 includes a lower wire 58 extending in the seat width direction at the lower end portion, and a pair of left and right guide wires 60 extending upward from both end portions of the lower wire 58 in the seat width direction.

The upper end portions 62 of the pair of left and right guide wires 60 include a locked portion 62A extending in the seat width direction and a supported portion 62B extending substantially upward from an outer end portion of the locked portion 62A in the seat width direction. The locked portion 62A is locked to a locking portion 82 of the basket 54 described later. The supported portion 62B is inserted into and fitted to the upper support portion 36A (see FIG. 1) of the bridge frame 36.

The back support device 10 further includes an upper frame portion 64 extending in the seat width direction. Both end portions of the upper frame portion 64 in the seat width direction are fixed to upper portions of the pair of left and right guide wires 60 on the lower side of the locked portion 62A.

The back support device 10 includes a lower frame portion 66 connected to the lower wire 58 and extending in the seat width direction. A coupling portion 68 is connected to a central portion of the lower wire 58 in the seat width direction. The coupling portion 68 is formed with a pair of left and right lower support holes 68A. The coupling portion 68 is fastened to the lower frame 30 of the seat back frame 22 (see FIG. 1) by bolts (not illustrated) inserted into the lower support holes 68A.

(Lumbar Support Portion 52)

The lumbar support portion 52 includes an upper lifting/lowering portion 70 provided in an upper portion and a lower lifting/lowering portion 72 provided in a lower portion. The upper lifting/lowering portion 70 and the lower lifting/lowering portion 72 are slidably engaged with the pair of left and right guide wires 60 at both end portions in the seat width direction. The upper lifting/lowering portion 70 and the lower lifting/lowering portion 72 are connected in a substantially vertical direction by a pair of left and right arch forming portions 74. The arch forming portion 74 is made of, for example, a metal plate or a resin plate having belt-like elasticity with the vertical direction as a longitudinal direction.

The lumbar support portion 52 further includes a support portion lifting/lowering mechanism 76 provided on the right side and an arch deformation mechanism 78 provided on the left side at the central portion in the seat width direction.

The support portion lifting/lowering mechanism 76 includes a screw shaft 76A extending in the vertical direction, a motor 76B provided in the lower lifting/lowering portion 72, and a gear mechanism (not illustrated) that connects the motor 76B and the screw shaft 76A. The screw shaft 76A is screwed to a nut (not illustrated) provided in the lower lifting/lowering portion 72. The screw shaft 76A has an upper end portion fixed to the upper frame portion 64 and a lower end portion fixed to the lower frame portion 66. The support portion lifting/lowering mechanism 76 is a feed screw mechanism that moves the upper lifting/lowering portion 70 and the lower lifting/lowering portion 72 up and down integrally by driving the motor 76B.

Meanwhile, the arch deformation mechanism 78 includes a screw shaft 78A extending in the vertical direction, a motor 78B provided in the lower lifting/lowering portion 72, and a gear mechanism (not illustrated) that connects the motor 78B and the screw shaft 78A. The screw shaft 78A is screwed to a nut (not illustrated) provided in the lower lifting/lowering portion 72. The screw shaft 78A has an upper end portion fixed to the upper lifting/lowering portion 70 and a lower end portion fixed to the lower lifting/lowering portion 72. The arch deformation mechanism 78 is a feed screw mechanism that moves the upper lifting/lowering portion 70 in the vertical direction with respect to the lower lifting/lowering portion 72 by driving the motor 78B. The arch deformation mechanism 78 is configured to deform the arch forming portion 74 by changing an interval between the upper lifting/lowering portion 70 and the lower lifting/lowering portion 72 as described above.

(Basket 54)

The basket 54 of the back support device 10 is formed of, for example, a resin material, and includes a plate-shaped basket main body 80 formed integrally. The basket main body 80 includes an upper end portion 80A provided with a pair of left and right locking portions 82, a central lower portion 80B formed at a central portion in the seat width direction from a substantially central portion in the vertical direction to a lower end portion, and a plurality of left and right pair of side portions 80C extending in the left-right direction from both end portions in the seat width direction of the central lower portion 80B.

The pair of left and right locking portions 82 is provided at both end portions in the seat width direction of the upper end portion 80A in the basket 54. Specifically, the pair of left and right locking portions 82 includes a base portion 82A provided on the seat rear side surface of the basket main body 80 and a hook 82B formed in a downward substantially L-shape in a side view. The hook 82B extends from the rear side to the rear side and the lower side of the base portion 82A.

By hooking the pair of left and right hooks 82B on the locked portions 62A of the pair of left and right guide wires 60, the locking portion 82 of the basket 54 is locked to the locked portion 62A of the support wire 56. The locking portion 82 is not limited to the configuration in which the pipe-shaped locked portion 62A is locked by the hook 82B, and may be locked to the locked portion by another method.

[Main Configuration of Back Support Device 10]

An opening portion 50 penetrating in the plate thickness direction (substantially the front-rear direction) is formed in an upper portion of the basket main body 80 and at a central portion in the seat width direction. The opening portion 50 is formed in a substantially rectangular shape whose seat width direction is the longitudinal direction when viewed from the front-rear direction. The duct portion 44A (see FIG. 1) of the air conditioning device 40 is inserted through the opening portion 50 of the basket 54.

Figure 4:
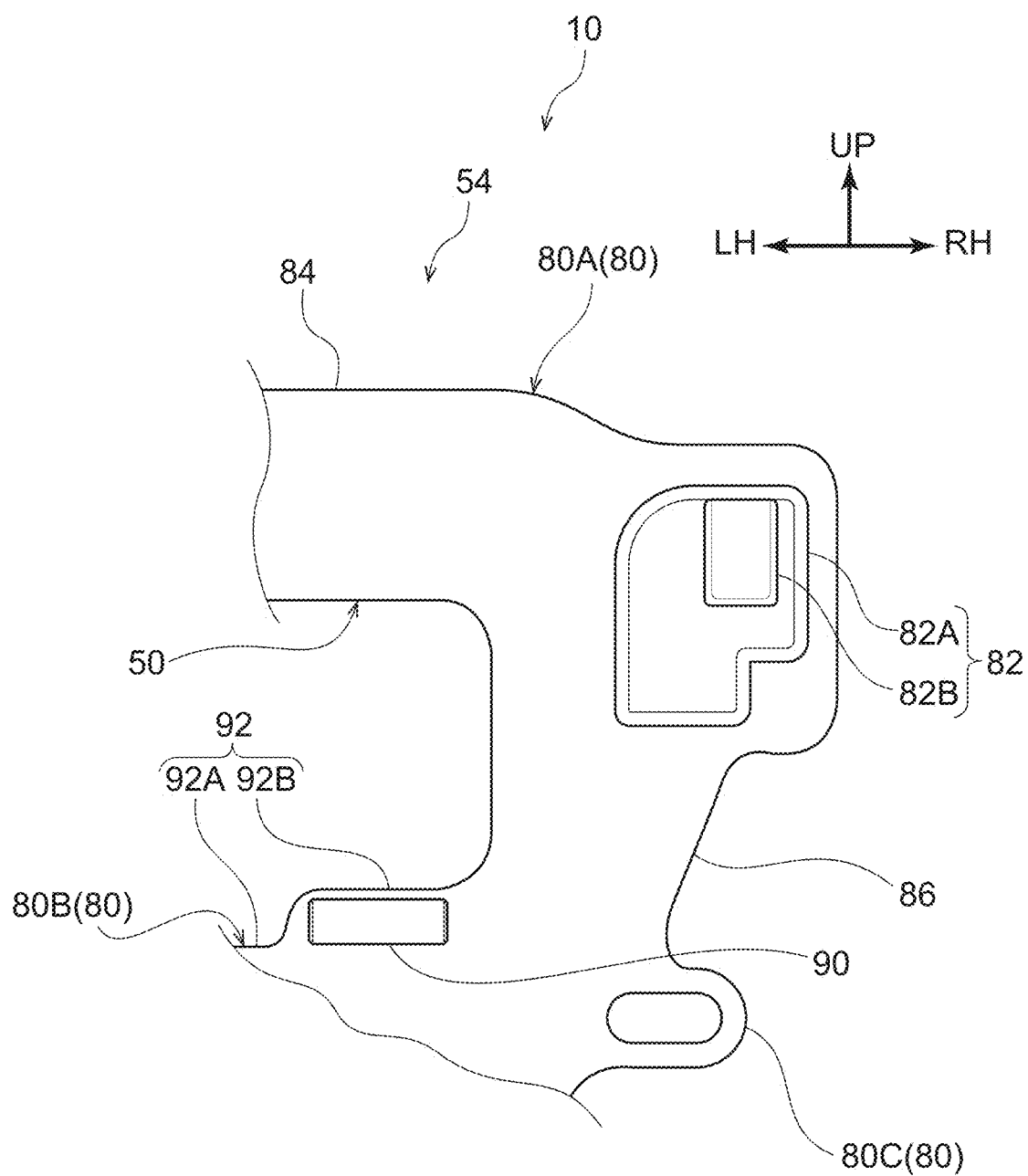
FIG. 4 is an enlarged rear view of a main part of the pressure receiving portion of the back support device illustrated in FIG. 2.

Since the opening portion 50 is formed in the basket 54, the upper end portion 80A of the basket main body 80 is formed in a substantially U shape with the lower side opened when viewed from the front-rear direction. Specifically, as illustrated in FIG. 4, the upper end portion 80A includes an upper portion 84 extending in the width direction and side portions 86 extending downward from both end portions of the upper portion 84 in the width direction. An upper portion of the side portion 86 is provided with a locking portion 82. The lower end portion of the side portion 86 is integrally connected to the central lower portion 80B of the basket main body 80 and the upper end portion of the side portion 80C provided at the uppermost portion among the plurality of side portions 80C.

Figure 5:
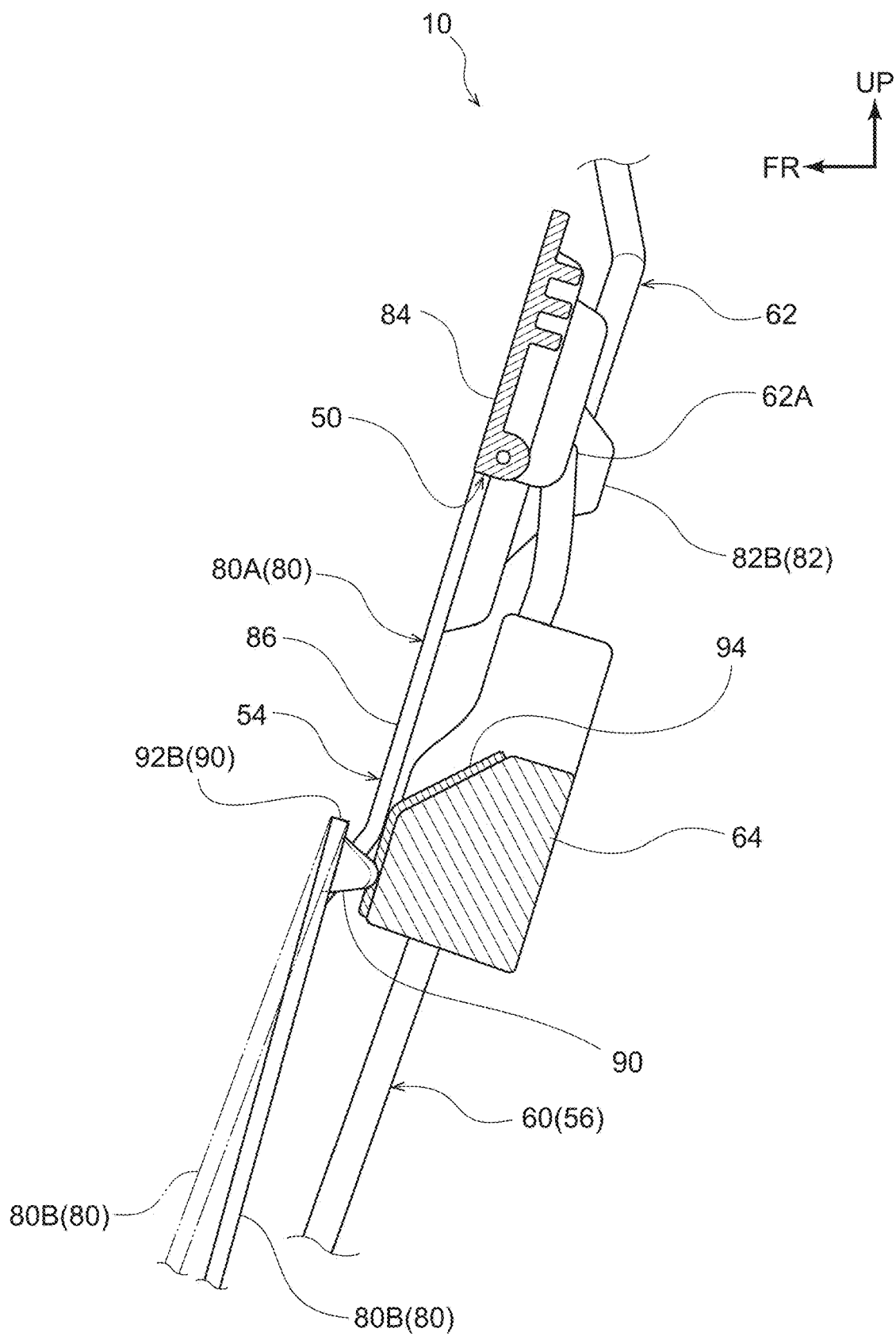
FIG. 5 is a side cross-sectional view of a cross section taken along line X-X in FIG. 3 as viewed from the left side of the seat.

Here, as illustrated in FIG. 2, on the seat rear side of the basket 54, a protrusion 90 protruding toward the seat rear side is integrally formed at a position facing the upper frame portion 64. As illustrated in FIG. 5, the protrusion 90 is formed in a substantially triangular shape in a cross-sectional view when viewed from the side, and a tip portion is formed in an arc shape.

As illustrated in FIG. 4, the protrusion 90 is formed at the upper end portion of the central lower portion 80B, and extends in the seat width direction at a position on the inner side and the lower side of the locking portion 82 in the seat width direction. The protrusion 90 is formed in a substantially rectangular shape when viewed from the seat rear side, and a pair of left and right protrusions are formed.

In the lower end edge 92 of the opening portion 50 of the basket 54, a central portion 92A in the seat width direction is formed below the end portion 92B. The pair of left and right protrusions 90 are formed on the outer side in the width direction of the central portion 92A and on the lower side of the end portion 92B with respect to the lower end edge 92 of the opening portion 50.

As illustrated in FIG. 5, a felt 94 is stuck to the seat front side of the upper frame portion 64. The felt 94 is formed in a substantially rectangular shape whose seat width direction is the longitudinal direction when viewed from the seat front-rear direction. The duct portion 44A (see FIG. 1) of the air conditioning device 40 passes through the upper side of the felt 94 and is inserted into the opening portion 50.

The basket 54 is supported by the upper frame portion 64 from the rear side in a state where the protrusion 90 abuts on the felt 94. The central lower portion 80B of the basket main body 80 is configured to be deformable with the protrusion 90 provided at the upper end portion as a fulcrum. In FIG. 5, a two-dot chain line indicates a state of the central lower portion 80B of the basket main body 80 in a non-seated state of the occupant P. A central lower portion 80B indicated by a solid line indicates a state deformed by seating of the occupant P. The back support device 10 need not include the felt 94.

In the present embodiment, the protrusion 90 is formed in a substantially rectangular shape whose seat width direction is the longitudinal direction when viewed from the seat rear side, and is formed in a substantially triangular shape in a cross-sectional view when viewed from the side. However, the present invention is not limited to this. For example, a structure of a first modification illustrated in FIG. 6 or a structure of a second modification illustrated in FIG. 7 may be adopted. In the following description of the first modification and the second modification, the same reference numerals are given to the same configurations as those of the present embodiment, and the description thereof is appropriately omitted.

First Modification

Figure 6A:
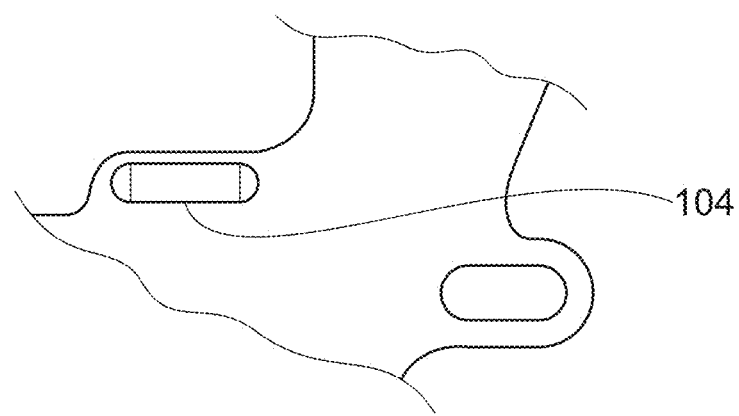
FIG. 6A is an enlarged rear view of a main part of a pressure receiving portion in a back support device according to a first modification.
Figure 6B:
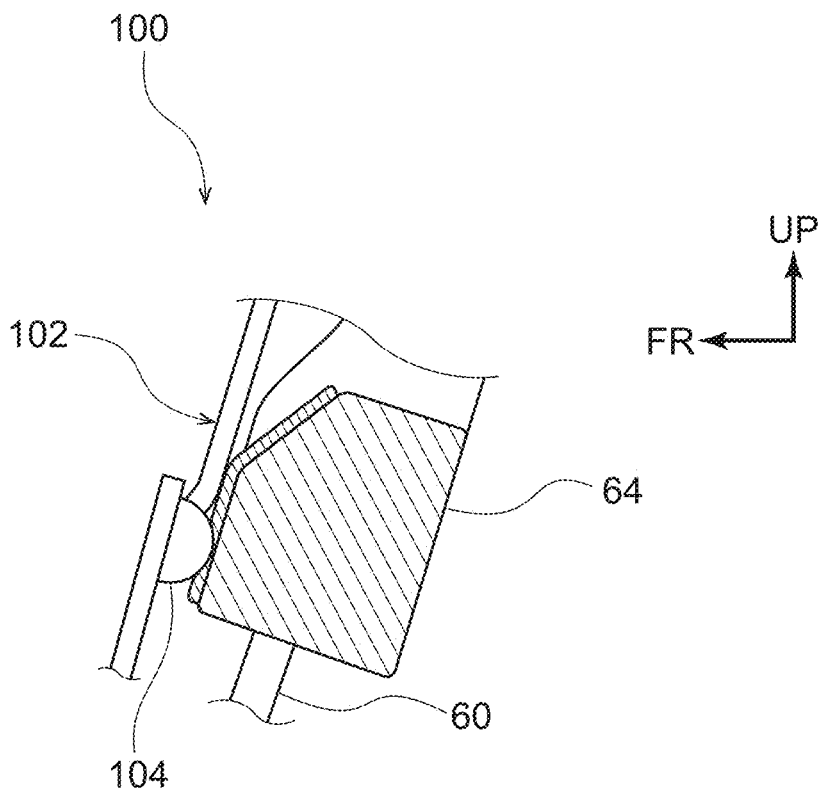
FIG. 6B is an enlarged side cross-sectional view of the main part of the pressure receiving portion in the back support device according to the first modification as viewed from the left side of the seat.

As illustrated in FIG. 6A, in a back support device 100 of the present modification, a protrusion 104 of a basket 102 has a shape in which both end portions in the seat width direction are curved so as to protrude outward in the width direction. As illustrated in FIG. 6B, the protrusion 104 is formed in a substantially semicircular shape in a cross-sectional view as viewed from the side.

Second Modification

Figure 7A:
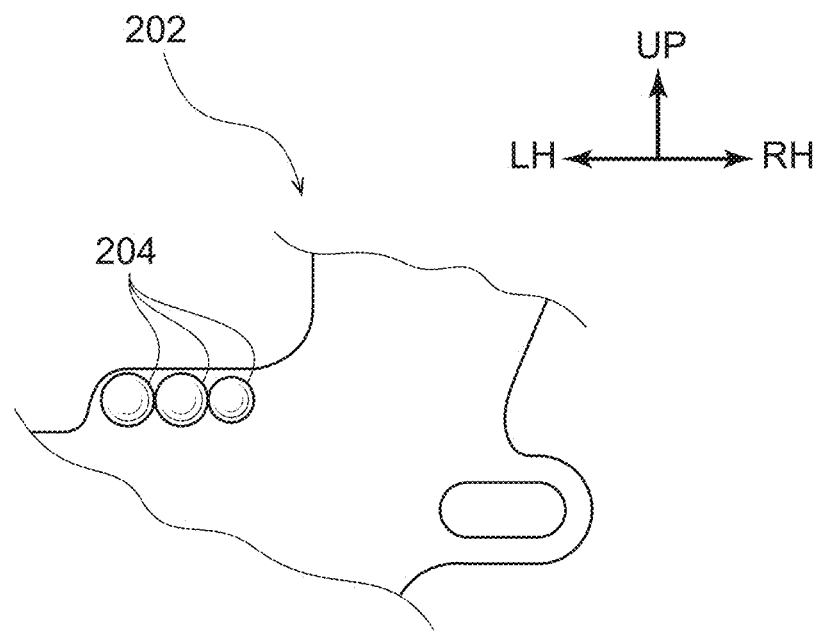
FIG. 7A is an enlarged rear view of a main part of a pressure receiving portion in a back support device according to a second modification.
Figure 7B:
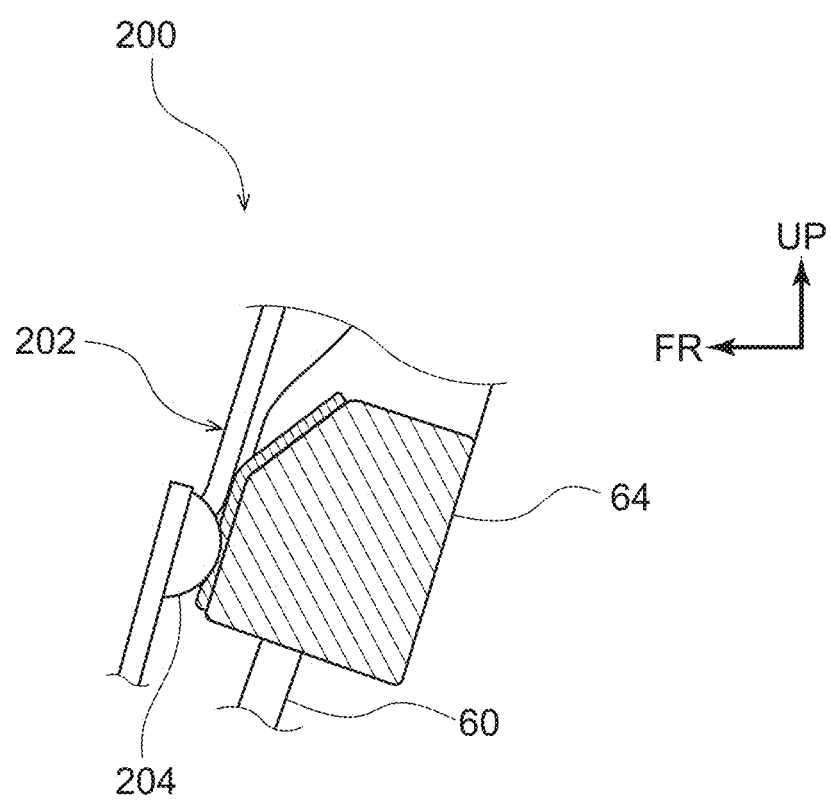
FIG. 7B is an enlarged side cross-sectional view of the main part of the pressure receiving portion in the back support device according to the second modification as viewed from the left side of the seat.

As illustrated in FIGS. 7A and 7B, in a back support device 200 of the present modification, three protrusions 204 of a basket 202 are formed in a hemispherical shape and arranged side by side in the seat width direction. The number of the protrusions 204 is not limited to 3.

Operation of Present Embodiment

Next, the operation of the present embodiment will be described.

According to the back support device 10 of the present embodiment, when the occupant P sits on the vehicle seat 12 (see FIG. 1), the basket main body 80 of the basket 54 is deformed by receiving a load from the back B of the occupant P. In this case, the load applied to the basket 54 is transmitted to the support wire 56 via the locking portion 82, the upper frame portion 64, and the lumbar support portion 52.

Here, the waist of the occupant P is supported by the lumbar support portion 52. While the lumbar support portion 52 is engaged with the lower portion of the support wire 56, the upper frame portion 64 is fixed to the upper portion of the support wire 56. Therefore, the back B on the upper side of the waist L of the occupant P is supported by the upper frame portion 64. That is, by the basket 54 supported from the seat rear side by the lumbar support portion 52 and the upper frame portion 64, not only the waist L of the occupant P is supported but also the back B thereof in a wide range including the upper side of the waist L is supported.

The basket 54 is supported at at least three locations of the locking portion 82, the protrusion 90 supported by the upper frame portion 64, and the portion supported by the lumbar support portion 52 in a side view. Here, the locking portion 82 provided at the upper end portion 80A of the basket 54 is locked to the locked portion 62A of the support wire 56 on the upper side of the upper frame portion 64. Therefore, the back B of the occupant P can be stably supported in a wide range.

Since the locking portion 82 provided at the upper end portion 80A of the basket 54 is locked to the locked portion 62A of the support wire 56, the position of the locking portion 82 with respect to the support wire 56 is constant regardless of the seated state of the occupant P. Therefore, for example, even in a case in which the occupant P leans largely against the seat back 16 while seated or takes a posture of stretching to warp the back B, it is possible to prevent the upper end of the basket 54 from protruding toward the back B of the occupant P and giving discomfort.

According to the back support device 10 of the present embodiment, as illustrated in FIG. 5, the central lower portion 80B of the basket 54 is rotated about the protrusion 90 with the seat width direction as the axial direction. Therefore, on the front side of the upper frame portion 64, the basket 54 can smoothly change its direction.

In the basket 54, while the upper portion 84 and the side portion 86 of the upper end portion 80A support the upper portion of the back B of the occupant P, the weight of the basket 54 can be reduced by the opening portion 50. Another device can be provided in the opening portion 50.

Here, as described above, since the position of the locking portion 82 with respect to the support wire 56 is constant regardless of the seated state of the occupant P, deformation of the upper end portion 80A is suppressed. Since the basket main body 80 is integrally molded, even when the central lower portion 80B is rotated about the protrusion 90 in the basket main body 80, the deformation of the upper end portion 80A is suppressed, so that the lower end edge 92 of the opening portion 50 can be suppressed from protruding forward. Therefore, it is possible to prevent the lower end edge 92 from protruding toward the back B of the occupant P and giving discomfort while providing the opening portion 50.

According to the vehicle seat 12 of the present embodiment, the load transmitted from the back B of the occupant P to the support wire 56 via the basket 54 is transmitted to the seat back frame 22 connected to the support wire 56. Therefore, the back B of the occupant P is comfortably supported by the seat back 16 including the back support device 10. As a result, it is possible to suppress discomfort to the occupant P regardless of the posture of the occupant P.

Since the duct portion 44A connected to the blower 42 is inserted through the opening portion 50 of the basket 54 in the back support device 10, the air conditioning device 40 can be disposed in the seat back 16 with high space efficiency. In particular, since the opening portion 50 is provided at the central portion of the basket main body 80 in the seat width direction, as compared with the configuration in which the duct is disposed through the outside of the back support device 10 in the seat width direction, the air flow is not hindered, and the air-conditioning efficiency can be improved.

According to the back support device 10 of the present embodiment, the protrusion 90 is integrally molded on the seat rear side of the plate-shaped basket main body 80 molded using a resin material. Therefore, it is possible to easily cope with the design change as compared with a case in which the protrusion is provided in the upper frame portion 64.

The duct portion 44A of the air conditioning device 40 is inserted into the opening portion 50 through the upper side of the felt 94 attached to the upper frame portion 64. Therefore, damage to the duct portion 44A can be suppressed as compared with a case in which the duct portion 44A directly abuts on the upper frame portion 64.

Supplementary Description of Embodiment

In the above embodiment, the back support device 10 has been described as including the protrusion 90 on the rear side of the basket 54, but the present invention is not limited thereto, and the protrusion 90 need not be included. The protrusion 90 may be provided on the front side of the upper frame portion 64.

In the above embodiment, the opening portion 50 is formed in the basket 54, and the duct of the air conditioning device 40 is inserted through the opening portion 50. However, the present invention is not limited to this configuration. For example, the vehicle seat 12 need not include the air conditioning device 40. The opening portion 50 need not be formed in the basket 54.

In the above embodiment, it has been described that the back support device 10 is mounted on the vehicle seat 12, but the present invention is not limited thereto, and the back support device may be provided on another seat.

In the above embodiment, the air conditioning device 40 blows air to the seating surface side of the seat back 16. However, the present invention is not limited thereto, and the air conditioner may be a device that sucks air from the seating surface side of the seat back 16.

What is claimed is:

1. A back support device, comprising:
   a first frame portion provided at a seat on which a seated person is seated, the first frame portion including a locked portion at an upper portion of the first frame portion;
   a second frame portion fixed to the upper portion of the first frame portion and extending in a seat width direction below the locked portion;
   a lumbar support portion engaged with a lower portion of the first frame portion and configured to support a waist of the seated person from a seat rear side; and
   a pressure receiving portion including, at an upper end portion thereof, a locking portion locked to the locked portion, the pressure receiving portion being supported by the second frame portion and the lumbar support portion from the seat rear side, and being configured to be deformable by receiving a load from a back of the seated person,
   wherein a protrusion extending in the seat width direction and protruding toward the seat rear side is formed at a position facing the second frame portion at a seat rear side of the pressure receiving portion, the protrusion being formed below the locking portion so as to be spaced apart from the locking portion in a vertical direction, and the protrusion being supported by the second frame portion.

2. The back support device according to claim 1, wherein the pressure receiving portion includes an opening formed above the protrusion and penetrating the pressure receiving portion.

3. A vehicle seat, comprising:
   a seat back internally including the back support device according to claim 2, and a seat back frame to which the back support device is connected and which configures a frame; and
   a seat cushion connected to a lower end portion of the seat back and configured to support a hip and a thigh of a seated person.

4. The vehicle seat according to claim 3, further comprising:
   an air conditioner attached to a seat rear side of the seat back frame and performing at least one of blowing and suctioning of air; and
   a flow path forming portion connected to the air conditioner, inserted into the opening of the back support device, and performing at least one of the blowing of air to a seating surface side for seating in the seat back or the suctioning of air from the seating surface side.

* * * * *